(12) United States Patent  
Bunge

(10) Patent No.: US 9,512,819 B2
(45) Date of Patent: Dec. 6, 2016

(54) BALANCING OF WIND TURBINE PARTS

(71) Applicant: Steffen Bunge, Pinawa (CA)

(72) Inventor: Steffen Bunge, Pinawa (CA)

( * ) Notice: Subject to any disclaimer, the term of this patent is extended or adjusted under 35 U.S.C. 154(b) by 0 days.

(21) Appl. No.: 14/814,746

(22) Filed: Jul. 31, 2015

(65) Prior Publication Data
US 2016/0153427 A1    Jun. 2, 2016

Related U.S. Application Data

(62) Division of application No. 13/368,561, filed on Feb. 8, 2012, now abandoned.

(60) Provisional application No. 61/440,500, filed on Feb. 8, 2011.

(51) Int. Cl.
| F03D 7/00 | (2006.01) |
| F03D 1/06 | (2006.01) |
| F03D 1/00 | (2006.01) |
| F03D 11/00 | (2006.01) |
| F03D 11/04 | (2006.01) |

(52) U.S. Cl.
CPC ............ *F03D 1/0675* (2013.01); *F03D 1/008* (2013.01); *F03D 11/0091* (2013.01); *F03D 11/04* (2013.01); *F03D 17/00* (2016.05); *F05B 2260/96* (2013.01); *F05B 2270/802* (2013.01); *F05B 2270/8041* (2013.01); *Y02E 10/722* (2013.01); *Y02E 10/726* (2013.01)

(58) Field of Classification Search
None
See application file for complete search history.

(56) References Cited

U.S. PATENT DOCUMENTS

| 5,140,856 A | 8/1992 | Larsen | |
| 2002/0057345 A1* | 5/2002 | Tamaki | G06T 5/006 348/207.99 |
| 2008/0266426 A1 | 10/2008 | Zeng | |
| 2009/0266160 A1* | 10/2009 | Jeffrey | F03D 1/008 73/455 |
| 2010/0135788 A1* | 6/2010 | Qu | F03D 7/047 416/1 |
| 2011/0206511 A1 | 8/2011 | Frydendal | |
| 2012/0133779 A1 | 5/2012 | Ma et al. | |

(Continued)

FOREIGN PATENT DOCUMENTS

| JP | 2010229824 | 10/2010 |
| WO | 2009129617 | 10/2009 |
| WO | 2011051778 | 5/2011 |

*Primary Examiner* — Kevin McInnish
(74) *Attorney, Agent, or Firm* — Adrian D. Battiso; Ade & Company Inc.

(57) ABSTRACT

A wind of the type having a tower and a nacelle with a rotor rotatably connected to the nacelle for rotating about a rotor axis and having a plurality of equally spaced blades has the rotor balanced by firstly taking a measurement of torsional vibration and then by using photographic techniques to analyze dynamic imbalance caused by differences in the angle of attack of the blades. The torsional vibration is detected using two sensors at positions mirrored exactly in distance to the left and right of the rotor axis and detecting vibration in the axial direction. The angle of attack is measured by analyzing images of the tip of the blade where, during the analysis, distortion in angles at different locations in the image are corrected, in dependence upon a prior analysis of an image taken by the camera relative to a known image.

9 Claims, 9 Drawing Sheets

(56) References Cited

U.S. PATENT DOCUMENTS

2012/0133780 A1\* 5/2012 Zhang ................... G06T 7/0018
    348/187
2012/0134813 A1\* 5/2012 Nies ........................ F03D 7/022
    416/1
2012/0183399 A1\* 7/2012 Perkinson ............. F03D 7/0224
    416/1

\* cited by examiner

BALANCING OF WIND TURBINE PARTS

This application is a divisional application of application Ser. No. 13/368,561 filed Feb. 8, 2012.

This application claims the benefit of priority under 35 USC 119(e) of Provisional Application 61/440,500 filed Feb. 8, 2011.

This invention relates to a method of aerodynamic balancing a rotor of a wind turbine of the type comprising a tower and a nacelle mounted to the top of the tower, the rotor being rotatably connected to the nacelle for rotating about a rotor axis and having a plurality of equally spaced blades around the axis.

BACKGROUND OF THE INVENTION

Wind turbines in HAWT design (horizontal axis) consist of four main parts as a structure, the base, the tower, the nacelle and the rotor with one or more blades.

The blades are mounted at fixed angularly spaced positions around the axis. The turbine includes a wind detection system which analyses the wind speed and direction repeatedly so as to repeatedly adjust the angle of the nacelle around a vertical axis of the tower, that is the angle of the rotor axis relative to the wind direction, and to adjust the angle of attack of the blades around the longitudinal axis of the blade relative to the wind speed.

Turbines if out of balance will cause significant vibration in the tower and can if sufficient rapidly deteriorate the structure or individual components to a position where it cannot be repaired or leave the turbine in an unsafe condition to operate in. Periodic checking of the state of balance must therefore be carried out.

Some manufacturers apply specific hardware and use methods such as theodolites or other template based methods to ensure ideal alignment between blades, without recording pictures but adjusting in real time.

Several attempts have been made to measure the angles remote from the ground with simple photograph based measurements but are not satisfactory. In most cases no suitable procedures were taken to verify measurements. In other cases vibration measurements have revealed results inconsistent with the measurements taken.

One attempt for the determination of a blade angle is described in patent application WO 2009/129617 (Jeffrey et al) published 29 Oct. 2009, the disclosure of which is incorporated herein by reference, or to which reference may be made for details not described herein.

When followed, the described methods in that patent application are unsatisfactory in that the measurements taken will include errors which up to now have not been determined so that this method has not lead to a satisfactory solution. Furthermore, the methods are of limited practical value and may provide a serious risk to the safe operation of a wind turbine when used as the base of further decision making.

In addition to analyzing the aerodynamic related moments and the mass moments, it is necessary to try to measure effectively the actual vibration that is occurring to determine whether any adjustments which are made are improving the total balance situation or are not. If the analysis of the aerodynamic related moments and the mass moments is based on faulty data, it is very possible that any adjustments made actually create a deteriorating situation so that the amount of vibration worsens.

Typically the evaluation of torsions vibration modes is made with two lateral sensors; but this is not suitable or reliable if the center of the torsional movement is not accurately determined. The arrangement of the nacelle mass, the hub and rotor mass as well as all other components mounted on the tower causes a situation where the center for torsional movement is not identical with the center of the tower so that this manner of measuring balance is inaccurate and can lead to faulty conclusions.

Furthermore it is known that rearrangements of heavier parts in the wind turbine as well as exchange of parts, for example the use of a lighter generator, can easily shift this center and lead to misleading readings on torsional vibration evaluation.

Up to now therefore balancing of turbines of this type has been ineffective and in some cases has lead to a situation where the results are confusing or even worsen the situation.

In view of the very high capital cost of this equipment, methods to accurately and inexpensively maintain the turbine in balance are very important.

SUMMARY OF THE INVENTION

It is one object of the present invention to provide a method of aerodynamic balancing a rotor of a wind turbine of the type comprising a tower and a nacelle mounted to the top of the tower, the rotor being rotatably connected to the nacelle for rotating about a rotor axis and having a plurality of equally spaced blades.

According to the invention there is provided a method of aerodynamic balancing a rotor of a wind turbine, the wind turbine comprising a tower and a nacelle mounted to the top of the tower, the rotor being rotatably connected to the nacelle for rotating about a rotor axis and having a plurality of equally spaced blades, the method comprising:

positioning a camera below the rotor;

rotating the rotor so that each blade in turn is in a reference position in which a tip of the blade is directed toward the camera;

capturing a minimum of one image of the tip of each blade in turn in the reference position;

carrying out an analysis of the image to determine a blade angle of each blade;

in the event that a blade angle of one of the blade is different from that of the other blades by a blade angle difference greater than a predetermined angle, adjusting said one of the blades to reduce the blade angle difference;

and during the analysis, correcting angles at different locations in the image, in dependence upon a prior analysis of an image taken by the camera relative to a known image.

Preferably different points of the image of the tip are identified in the image and the angles between the different points are corrected in dependence upon their location in the image.

Preferably easily recognizable contour lines or reference points of the image of the tip or maximum width of the blade are used which are selected so that they are identical on every blade.

Preferably the accuracy of the angle of attack is in the range of $\pm 1/10$ of a degree to $\pm 2/10$ of a degree.

Preferably during the analysis, correction is made for trapezoidal distortion in the image.

Preferably during the analysis, correction is made for trapezoidal distortion in the image caused by the angle between the optical axis during taking the photos compared to the vertical axis of the tower.

Preferably during the analysis, correction is made for trapezoidal distortion in the image caused by a measurement line created on a sloping away contour line, that is sloping away from the camera.

Preferably for the capturing of the image of the tip of each blade in turn, one of the blades is selected to be first imaged by applying a rotor lock to locate each blade in turn as close as possible to the vertically downward position and by taking an image of each blade in turn from a remote position to determine those that are closest in position to each other and to the vertically downward position and selecting as the first to be imaged one of those which are closest.

Preferably the method includes measuring the torsional vibration of the system before and after the adjustment.

Preferably the torsional vibration of the system is detected using two sensors at positions mirrored exactly in distance to the left and right of the rotor axis and detecting vibration in the axial direction.

Preferably the use of the two axial sensors in the axial direction and at the mirrored or exactly symmetrical distance from the axis eliminates all axial vibration by subtracting both axial signals and doubling the torsional signal at the same time.

Preferably in a wind farm of a plurality of wind turbines, the torsional vibration of each is measured and a number of the turbines is selected for analysis of the angle of attack having a vibration beyond a predetermined set value to avoid analyzing all of the blades of all of the rotors.

According to the invention there is provided a method of balancing a rotor of a wind turbine, the wind turbine comprising a tower and a nacelle mounted to the top of the tower, the rotor being rotatably connected to the nacelle for rotating about a rotor axis and having a plurality of equally spaced blades, the method wherein the torsional vibration of the system is detected using two sensors at positions mirrored exactly in distance to the left and right of the rotor axis and detecting vibration in the axial direction.

According to the invention there is provided a method of aerodynamic balancing a rotor of a wind turbine, the wind turbine comprising a tower and a nacelle mounted to the top of the tower, the rotor being rotatably connected to the nacelle for rotating about a rotor axis and having a plurality of equally spaced blades, the method comprising:
measuring the torsional vibration of the system;
adjusting the angle of attack of the blades by:
positioning a camera below the rotor;
rotating the rotor so that each blade in turn is in a reference position in which a tip of the blade is directed toward the camera;
capturing an image of the tip of each blade in turn in the reference position;
carrying out an analysis of the image to determine a blade angle of each blade;
in the event that a blade angle of one of the blade is different from that of the other blades by a blade angle difference greater than a predetermined angle, adjusting said one of the blades to reduce the blade angle difference;
and re-measuring the torsional vibration of the system to ensure that it is reduced by the adjustment.

The main sources of the inaccuracies are lens distortion and trapezoidal distortion and can be corrected with the methods described hereinafter.

In tests it could be shown that the errors obtained without the methods described herein can easily be shown to be in the range of several degrees.

The errors in analysis will therefore lead to wrong corrections of angles of the blades which will increase wear and tear of all wind turbine components through increased vibration limits.

The errors are in addition influenced by an offset angle caused by trapezoidal distortion. The power curve of a wind turbine will be negatively affected if adjusted with results not following the procedure described.

However every blade angle adjustment should be accompanied by a vibration measurement for ultimate verification of any adjustment made according to determined angle deviations between the blades.

The present disclosure as set out hereinafter provides a method to achieve sufficient measurements of angles for the purpose described with minimized errors caused by lens distortion and trapezoidal distortion. To minimize systematic errors the procedure describes ways to establish which blade should be selected as the first blade to be analyzed.

The result for any angle measurement following the described procedure represents the true physical angle within general measurement errors in the range of $\pm\frac{1}{10}$ of a degree to $\pm\frac{2}{10}$ of a degree or better.

The procedure describes how to establish and use suitable measurement equipment and methods.

FIG. 1 of the above application shows that there is no awareness of distortions caused by perspective (see FIGS. 7, 8 and 10). As well there is no awareness of distortion of the camera lens itself. Both together will cause wrong readings to be obtained thus invalidating any corrections made.

There is provided no indication as to how to effect selection of the first blade described which will lead to additional perspective distortion when any cone angle deviation or partition deviation is present, which is very often the case in wind turbines of this type.

For analysis, wind turbines rotor can be simplified and described as a rotor disc. The rotor blades cover only an area of that disc. The disc or all forces in it need to be balanced so that the sum of all forces is centered and identical with the center of rotation of the rotor shaft itself.

With the exception of a one blade rotor where a counter mass not a blade is used to achieve a balanced status in regards to the mass moment, on every other rotor with two or more blades the mass moments as well as aerodynamic related moments need to be balanced. As result the residual moments or the residual imbalance is minimized for safe operation of the turbine.

Both the mass moments and the aerodynamic related moments and their residual components in a rotor system are not individual measurable but are united for each rotor in an integral imbalance vector.

To determine and remove the mass imbalance of any given rotor with two or more blades, the effects of the aerodynamic related moments need to be first eliminated or minimized. If the aerodynamic part is not properly investigated, the result of a balancing procedure which provides the size and position of counter weights is flawed to an unknown degree and the result is that the turbine remains out of balance or worsens.

The aerodynamic part of the integral in many cases is treated as constant as a mass moment but in fact changes with the wind speed due to change in lift force. Thus balancing based on mass moments only, without the consideration of aerodynamic influences, is only valid for the same wind conditions that the balancing was performed on. The integral imbalance can be smaller or bigger at any other wind condition. The turbine therefore may be stable at one wind speed but unacceptably out of balance at other wind speeds showing increased vibration levels.

The main procedure to eliminate aerodynamic differences between the blades is to ensure that the angle of attack for every blade is the same or deviates only in given limits.

Therefore those angles of wind turbine blades need to be determined and deviations between the blades need to be evaluated. The desired accuracy is in the range of ±1/10 of a degree to ±2/10 of a degree. A standard industry value for limits on blade angle vibrations is 0.60 degree between individual blades (see Germanischer Lloyd Guideline-for-the-Certification-of-Wind-Turbines-Edition-2010-1(4.3.4.1 General influences) and IEC 61400-13(4.6 Sensor accuracy and resolution)). For some turbine manufacturers it might be bigger or smaller.

The absolute angle of attack of the airfoil of a wind turbine blade is not always directly visible or can be identified as such, however easily recognizable contour lines or reference points can be used as substitute, provided they are selected so that they are identical on every blade. Depending on the measurement goal this substitute can, but not necessarily has to have, a known position or relation to the angle of attack of the airfoil.

Aerodynamic imbalances caused by damaged or missing blade elements are not removed with the described procedure and are not subject of the patent application.

For initial calibration the most blades have zero degree or similar marks which need to be lined up with marks at the hub body or any other suitable reference. However those marks can get lost over time or are found to be wrongly placed initially. Because of the constant movement in the system (pitch system) the calibration in it can get lost over time or is incorrect as the result of a faulty pitch system. There is therefore a need to verify those calibrations in a fast and efficient manner.

The evaluation of torsions vibration modes with two lateral sensors is not suitable or reliable if the center of the torsion movement is not given. While for a 2d parameter for the location of the center of the torsional movement, the first position or parameter is given to be along the main shaft axis the position on the second parameter crossing the main shaft axis horizontal at 90 degree is unknown. The arrangement of the nacelle mass, the hub and rotor mass as well as all other components mounted on the tower does in all cases implement that the center for torsional movement is typically not identical with the center of the tower, but unknown in its location.

Furthermore the practice has shown in the past that rearrangements of heavier parts as well as exchange (e.g. lighter generator) can easily shift this center and lead to misleading readings on torsional vibration evaluation.

For verification of torsional vibration either a sensor measuring torsion directly or two sensors in axial position mirrored exactly in distance to the left and right of the main shaft axial axis shall be used.

DETAILED DESCRIPTION

Figure 7A:
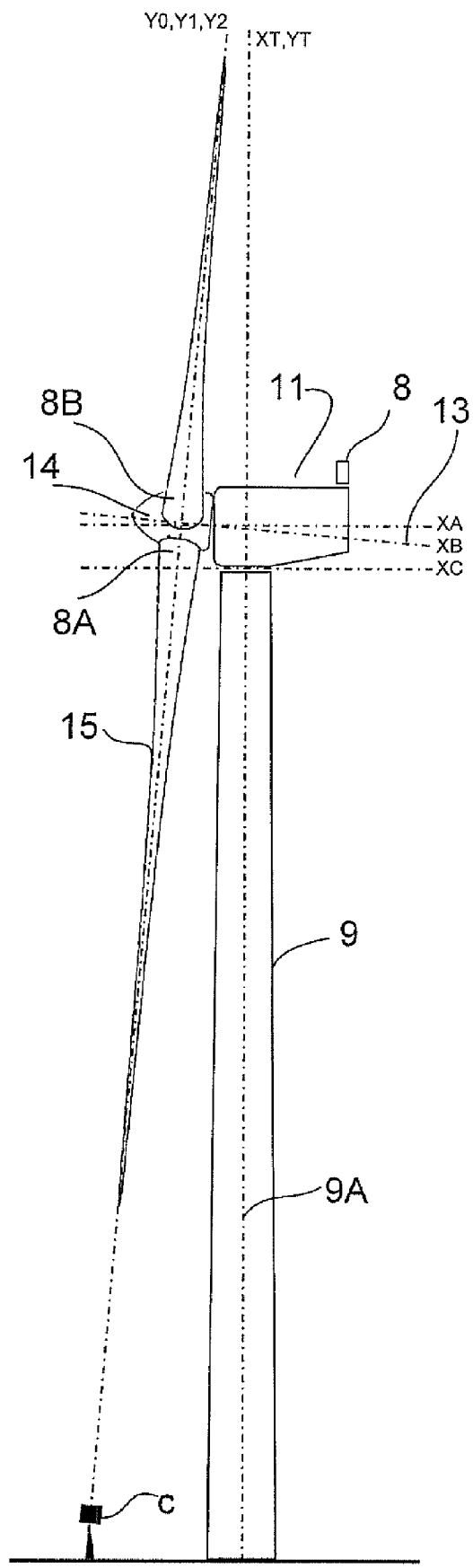
FIGS. 7A and 7B show schematically a side elevational view of the wind turbine showing angles used during the photograph an din calculating distortion correction.
Figure 7B:
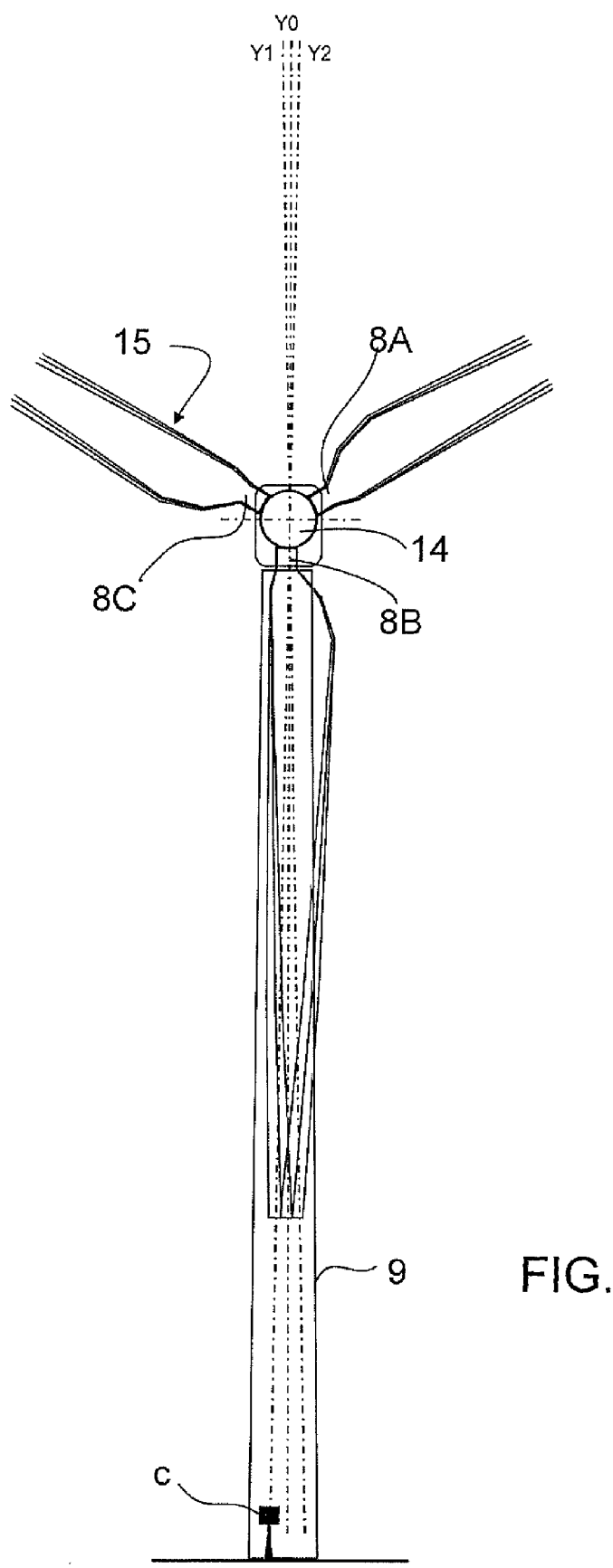

In FIGS. 7A and 7B is shown a conventional wind turbine. This includes a nacelle 11 mounted on a tower 9 underneath the nacelle. A main shaft 13 connects the drive train to the hub and rotor assembly of the hub body 14 carrying the blades 15 which are typically three blades arranged at 120 degrees. The blades 15 are mounted at fixed angularly spaced positions around the axis. The turbine includes a wind detection and control system 8 which analyses the wind speed and direction repeatedly so as to repeatedly adjust the angle of the nacelle 11 around a vertical axis 9A of the tower, that is the angle of the rotor axis 13 relative to the wind direction, and to adjust the angle A (FIG. 1) of attack of the blades 15 around the longitudinal axis of the blade relative to the wind speed.

Figure 9:
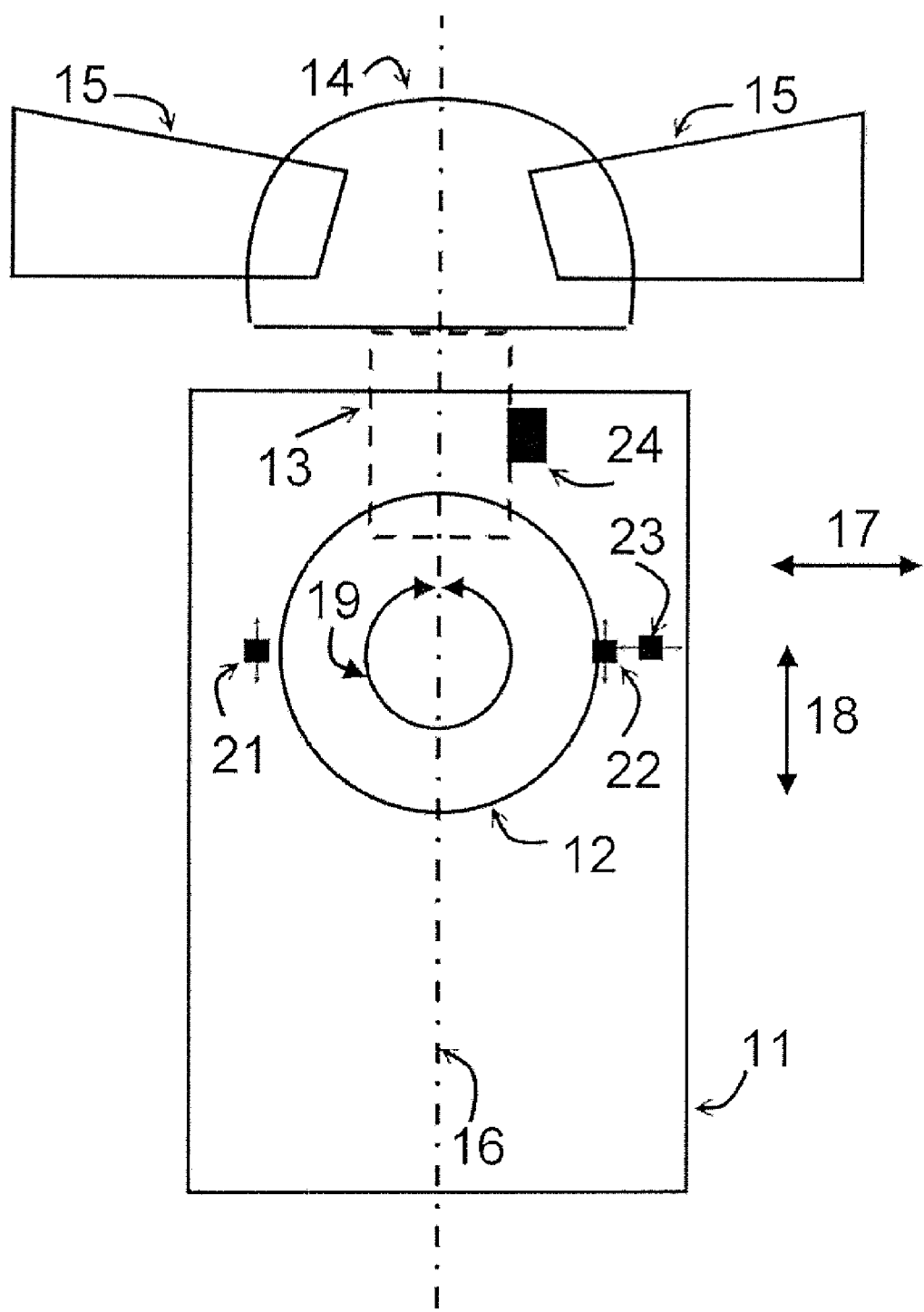
FIG. 9 is a schematic plan view of a wind turbine showing the location of sensors to detect vibrations.

Turning now to FIG. 9, a conventional wind turbine shown including a nacelle 11 mounted on a cylindrical tower underneath the nacelle. A main shaft 13 connects the drive train to the hub and rotor assembly of the hub body 14 carrying the blades 15 which are typically three blades arranged at 120 degrees.

An axial drive train axis 16 crosses the center of the tower 12 and defines a lateral direction 17 and an axial direction 18 together with a torsional direction 19 (subject to be shifted along axis 16).

A vibration sensor 21 can be located on one side of the axis 16 with its measurement axis or axis of sensitivity axial, that is arranged parallel to the axis 16. A second vibration sensor 22 can be located on the other side of the axis 16 with its measurement axis or axis of sensitivity axial, that is arranged parallel to the axis 16. The second sensor 22 is located at a mirrored position relative to sensor 21 in reference to the axis 16.

Other possible locations of vibration sensors 23 with its measurement axis lateral crossing the center of the tower as described in vibration sensor with measurement axis lateral crossing the center of the tower (as described in "Germanischer Lloyd Guideline-for-the-Certification-of-Wind-Turbines-Edition-2010-1" page 2-12 2.3.2.7.2) to sufficiently read vibrations for purpose of determination of an mass unbalance. Sensor 24 is an additional or integrated sensor for the revolution of the main shaft 13.

However the use of sensor 23 is unsuitable for torsional vibration reference as the center of torsion could be shown to be as much as 1.15 m ahead of the center of the tower. This creates a torsional vibration influence for both sensors in the two lateral sensor option as described in the above Patent Application WO29129617A1, leading to inaccurate torsion evaluation.

The use of the two axial sensors 21 and 22 in the axial direction and at the mirrored or exactly symmetrical distance form the axis 16 can eliminate all axial vibration by subtracting both axial signals and doubling the torsional signal at the same time. The measurement axis is only aligned with and will pick up the tangential part of the torsional vibration direction parallel to the drive train and tower axis. Even if the sensors are not mounted directly to the left and right of the tower axis lateral (which will be unknown in most cases) but shifted to the rear or front on the nacelle they are still only influenced by the same vibrations as long as they still have the same distance to the lateral axis 16 of the system which can be readily determined.

This makes the system independent and reliable to work with different weight distributions such as standard and light weight generators for otherwise identical turbines to be tested.

A single axial sensor 21 or 22 which used alone is influenced by axial tower vibration caused by aerodynamic "blade passing the tower" excitation as well as by potential mass unbalances. This is due to the fact that all modern wind turbine rotors main shafts are tilted (usually 5° or 6°) and the mass imbalance is rotating on a flat elliptical orbit aligned with the axial direction of the drive train.

The use therefore of two sensors 21 and 22 arranged as stated with their output combined provides a measure of vibration dependent on aerodynamic imbalances and independent of mass imbalance.

In the method of the present arrangement therefore an initial measurement is taken of the aerodynamic imbalances of the rotor. If this imbalance is less than a predetermined vibration value, a decision may be made to take no more measurements.

In the event that a decision is made based on this initial measurement to make an analysis of the dynamic imbalance of the rotor, as set out hereinafter, a first one of the blades is selected for first analysis. This blade is moved to the position in FIG. 7 for the image of the blade tip to be taken and analyzed to determine a blade angle of attack. Each blade in turn is then analyzed to determine its angle of attack so that a difference of the angle can be determined. Typically it can be found that one of the blades is distinctly different in angle from the others two so that it is clear that the adjustment of that blade is necessary by adjusting the set point of the angle of attack.

The adjustment system 8 is of course re-setting the require angle of attack of the blades on a repeated basis dependent on the wind speed. The system for this adjustment is well known and widely used on such turbines. Each blade has an individual adjustment 8A, 8B, 8C so as to calibrate the blades relative to the common adjustment system 8.

Thus, on determination of the necessity to adjust the angle of attack based on the above measured dynamic imbalance by the sensors 21 and 22, the analysis and adjustment of the angle of attack using the method more clearly set out hereinafter allows the dynamic balance to be adjusted. On completion of this adjustment, the above sensors are again tested to ensure that an improvement in balance and hence a reduction in vibration has occurred Thus for example in a wind farm of a plurality of wind turbines, the dynamic imbalance of each is measured using the sensors 21 and 22. Based on these measurements, a low number of the turbines may be selected for analysis of the angle of attack. These may be the ones having the worst measured vibration. In this way the analysis can be applied only to those having a vibration beyond a predetermined set value to avoid analyzing all of the blades of all of the rotors.

Figure 1:
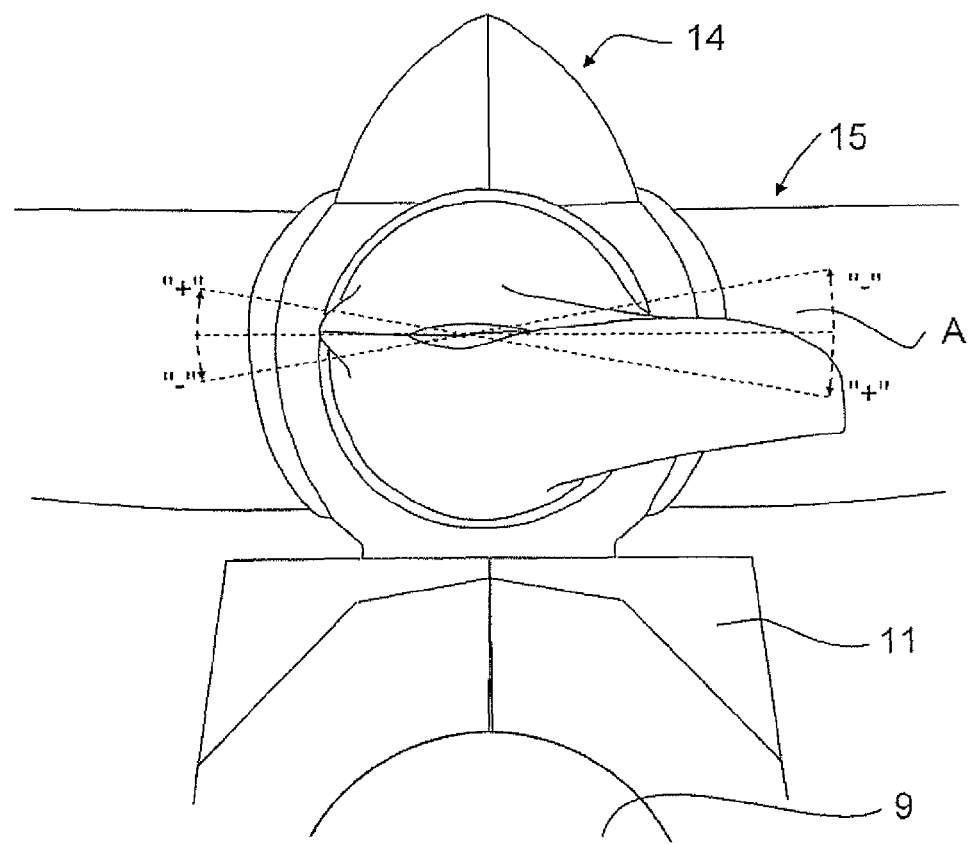
FIG. 1 is a front elevational view of a blade of a wind turbine and showing particularly the Angle of Attack at the blade.

FIG. 1 shows a symbolized view in a picture taken to assess blade angles, deviation thereof or absolute angles of attack thereof. A deviation between each blade can be described with a positive or negative angle. The direction "+" or "−" may vary and might be specified in the pitch control system. The same angles cannot only be used for comparison to each blade but also in reference to an objects which has a known geometric alignment to the rotor plane to determine the absolute angle of attack. Those objects are usually part of the nacelle 11 or a visible piece of main shaft 9. While the camera C is standing still the objects in FIG. 1 will not be at identical positions during a set of pictures within the picture due to movement of the turbines tower and head section and therefore the use of the outer limits of the picture frame have proven to be insufficient as reference for angle measurements.

Figure 2:
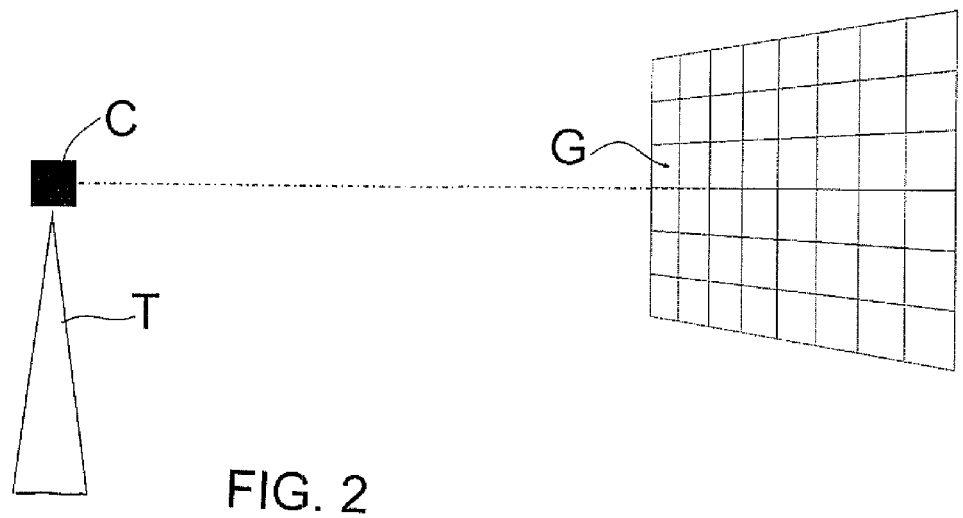
FIG. 2 is a schematic illustration of a general camera calibration setup for use in the present invention.

FIG. 2 shows the general setup for a camera to go through the calibration process. The camera C is mounted on a suitable mount like a tri-pod T and is lined up with the optical axis to the center of a grid made G of squares. Both the camera and the grid need to be perfectly levelled horizontal and vertical.

Figure 3:
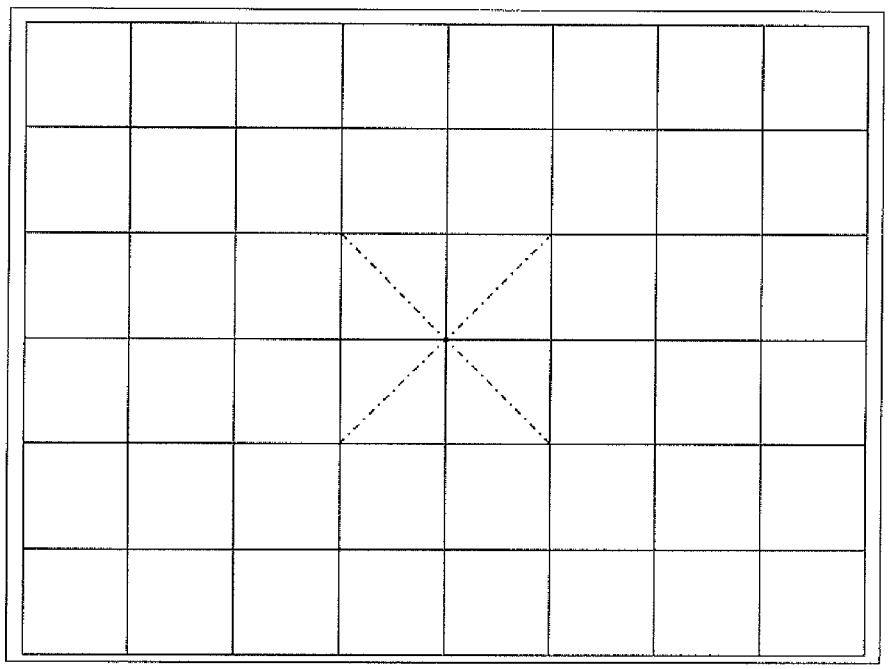
FIG. 3 is a schematic illustration of a calibration grid of squares with a marked center for use in the present invention.

FIG. 3 shows the general idea of a calibration grid. It contents of squares and has a marked center, easy to find through the cameras finder. A real calibration picture would usually have more and smaller squares, typically in the size of 2.5×2.5 cm.

Figure 4:
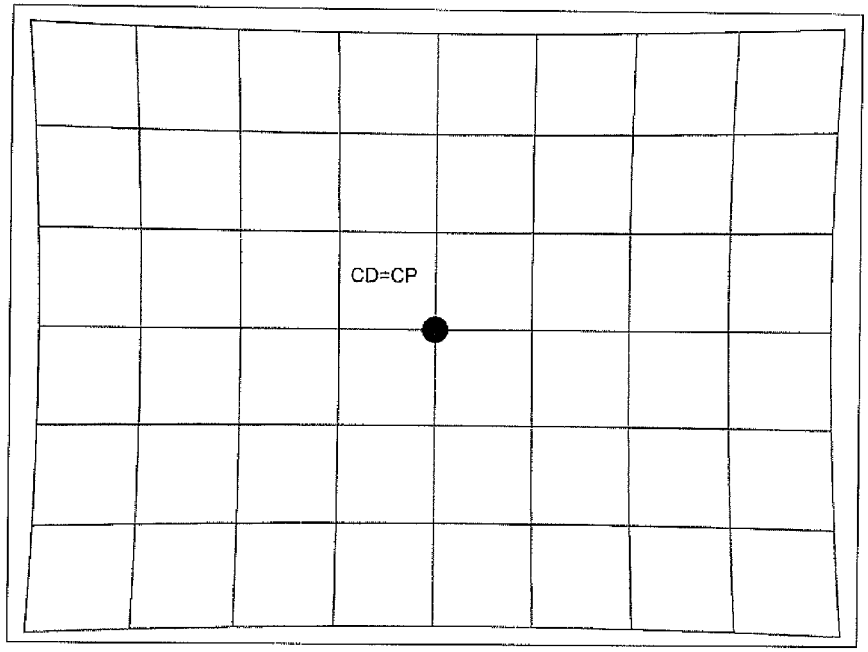
FIG. 4 shows the grid of FIG. 3 in a situation where the Center of distortion (CD)=center of picture (CP) with influence of an equally distributed pincushion distortion

In FIG. 4 where the Center of distortion (CD)=center of picture (CP), equally distributed lens distortion is shown as it would be in a picture taken from the calibration grid. Ideally the center of distortion and the center of the picture are identical, which allows a relatively easy compensation of such effects.

Figure 5:
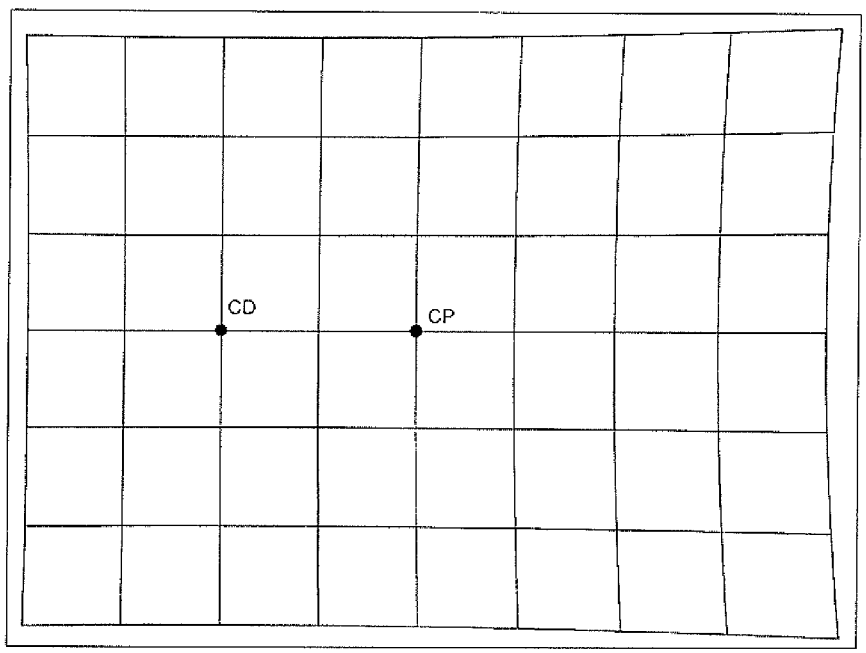
FIG. 5 shows the grid of FIG. 3 in a situation where there is a one dimensional deviation for center of distortion (CD) vs center of picture (CP) with influence of an unequally distributed pincushion distortion

In FIG. 5 where one dimensional deviation for center of distortion (CD) vs. center of picture (CP), it is quite possible that some cameras do have a non-equally centered distortion. In the figure the center of distortion is shifted to the left. Still some software might still have option for compensating this effect.

Figure 6:
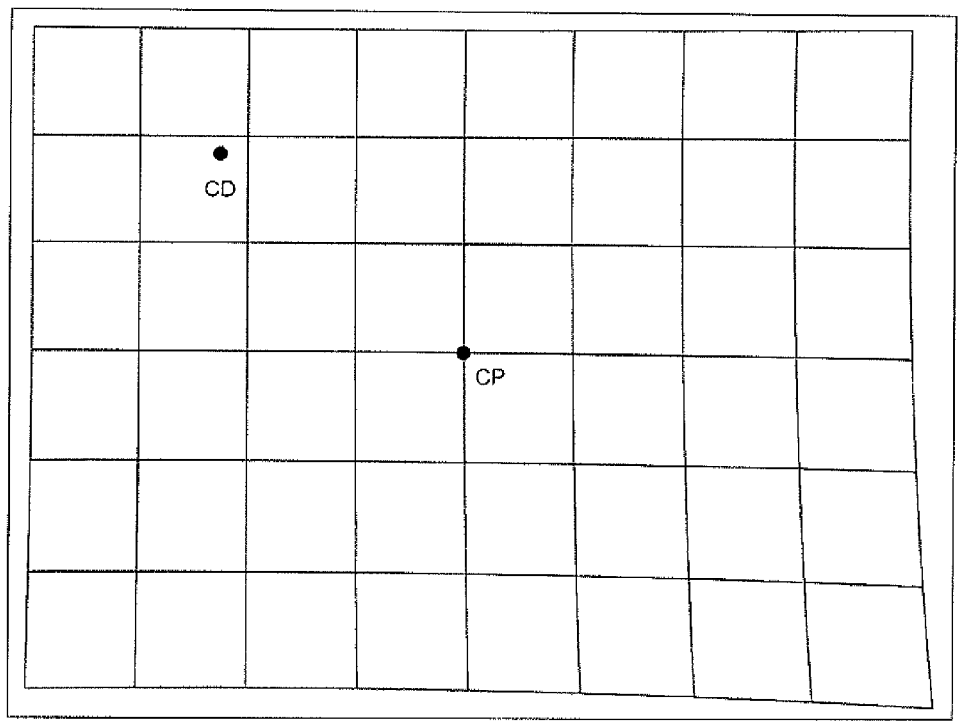
FIG. 6 shows the grid of FIG. 3 in a situation where there is a two dimensional deviation for center of distortion (CD) vs center of picture (CP) with influence of an unequally distributed pincushion distortion

In FIG. 6 where two dimensional deviation for center of distortion (CD) vs. center of picture (CP), it is quite possible that some cameras do have a non-equally centered distortion in two dimensions. In the figure the center of distortion is shifted to the left and up. This would be typical for a "soft mounted" or removable optical system, so that CD can be anywhere when ever the camera is shut down and switched on again. Cameras with this behavior are just not suited for the purpose.

As the result of distortion shown in FIGS. 4,5 and 6 lines being known to be perfectly parallel in FIG. 3 but being at any given position within the pictures influenced like in FIGS. 4, 5 and 6 would potentially create a variety of physically not existing angles (Ghost Angles) and result in false measurements.

In FIG. 7 showing angles during photograph, this figure is crucial for understanding potentially severe errors for measuring absolute angles of attack due to trapezoidal distortion. Every modern wind turbine has a tilted rotor plane axis XB relative to the nacelles axis XA or XC.

The optical axis from the camera is therefore usually tilted against the towers axis XY and YT too, away from the tower.

In the majority of cases the rotor blade cannot be positioned with the blades axis straight down and parallel to the tower axis YT, which causes another tilted angle Y0, Y1 or Y2 of the cameras axis relative to the tower axis to the left.

The main items causing errors are camera lens distortion, trapezoidal perspective distortion of measured areas and air temperature gradient distortions along the blade. Heat gradients in or close to designated measurement areas can be present in any pictures. The index of refraction of air decreases as the air temperature increases on heated surfaces like the blades, nacelle or tower thus causing distortion in any picture taken while this condition exists. Air temperature gradient distortions can in most cases be relatively easy be identified as areas of the pictures might appear like smeared, in part missing or objects of known geometry are severely deformed.

The removal of camera lens distortion and trapezoidal perspective distortion is possible to be corrected with the described methods. Temperature gradient distortions along the blade are not possibly to be corrected with methods described but deem any pictures taken with those effects to be not usable.

The following steps of methods need to be taken for the measurement targets.
 I. Calibration of the camera (all types of cameras including film and digital cameras and camcorders).
 II. Establishing objects or reference marks with a known geometrical position relative to the drive train axis 13 preferably at the nacelles floor visible within the measurement picture to be taken.
    (only necessary if the absolute angle of attack needs to be determined)
 III. Taking pictures or series of individual blades in designated positions
 IV. Applying lens distortion correction methods with data gained and "I." on pictures or isolated video stream pictures.
 V. Establishing objects and references in the designated pictures to be measured with lines individual points or geometric objects.
 VI. Determine the position of objects and references in the designated pictures to be measured.
 VII. Determine the trapezoidal distortion for the objects and references established under II
 VIII. Direct measure or calculate angles between the objects targeted to represent angles for analysis and comparison as final result of the measurement or as intermitted result for further data processing. If the absolute angle of attack was the measurement target the angle has to be determined between the blade related measurement object and the for trapezoidal distortion corrected reference line.

The following is a description of individual steps as part of methods need to be taken for the measurement targets.

For serious measurements especially when to be sold as result and base for further decision making every measurement equipment needs to be calibrated to insure most accurate results.

All cameras use objectives to project a 2D picture of any object which is in its view to a electronic chip or film material. Those objectives do always have a lens distortion, which will create "Ghost Angles" exceeding the desired accuracy in a described measurement.

The Calibration process documents the distortion and is the base for countermeasures to remove this type of distortion for each individual camera in combination with the used objective.

The parameter gained as to describe the lens distortion for the pictures taken with a specific camera need to be applied later in the process to measurement pictures taken to remove those effects and making the pictures suitable for accurate measurements.

Step 1 For the method described a camera needs to be designated. Each camera needs to go trough the calibration process separately. A typical digital camera for this purpose should have 6 megapixel or better and an optical zoom of 10× or better.

Step 2 It needs to be assured that the optical system of the camera is suited for the measurements. This does include a necessary zoom function. In certain cases the camera was used in a similar process as described and would be known to full fill those requirements. If requirements are fulfilled proceed with Step 6

Step 3 With any new camera a test picture needs to be taken ideally at the type of turbine to be measured. Cameras might not be universal to be used for a variety of turbines.

Step 4 The camera can be classified as sufficient if all designates measurement areas can be seen with full optical zoom (digital zoom disabled). If requirements are fulfilled proceed with Step 6

Step 5 If the optical zoom is to strong and does zoom in to much, it needs to be found out whether the camera can be restricted to a fixed lower rate for the optical zoom in the camera's setup menu.

The zoom level needs to be constant for all pictures to avoid additional measurement errors. The steps which can be applied manually with the camera are not accurate enough in the most cases.

If this can not be achieved the camera is not suited for the task and a different one needs to be designated. Return to Step 1

Step 6 With the camera designated for the task a calibration setup needs to be established under controlled environments, usually inside. The camera needs to be mounted on a tri-pod or similar.

Step 7 If there is a suitable calibration picture available the camera should be pointed straight to it using maximal (or alternatives Step 5) optical zoom. Both the calibration picture and the camera need to aligned horizontal. The center of the camera screen (picture) should be directed to the calibration pictures center. If there is a suitable calibration picture available proceed with Step 9

Step 8 If no suitable calibration picture is available one needs to be created. It should consist at least from squares with a distinctive center. The squares can usually be about 2.5×2.5 cm in a distinctive color. If the calibration picture is fixed mounted it needs to be made sure that it is perfectly horizontal. The overall calibration picture should be big enough to cover more then the camera will be able to cover in a picture with full zoom.

Step 9 Take a series of calibration pictures. Shut down the camera move it away from the tri-pod shake it, mount it again and take more pictures.

Step 10 Analyzing the pictures is done best by comparing the calibration picture deformation to a distortion free grid provided with some software overlapping the picture or by drawing perfectly horizontal and vertical lines as an overlay to the picture.

Step 11 It needs to be identified whether the distortion is centered and equal in all 4 quarters of the picture for all pictures including pictures taken after the camera was shut off and moved. For this purpose quarters side by side can be mirrored and overlapped for this matter. If distortion is centered and equal in all 4 quarters proceed with Step 14.

Step 12 If the distortion is not centered in one dimension, which means only to the side or only up or down it might not be feasible to go ahead with an calibration of the camera. However some programs do offer lens correction with "off center" distortion.

Since some optical systems for cameras are "soft" mounted the distortion might not be constant for all pictures taken in this process. Proceed to Step 15.

Step 13 If the camera does show no stable distortion for all pictures or the distortion is not centered at all, the camera should be discarded for use in this process. Proceed to Step 1

Step 14 For regular distortion software or mathematical routines can be used to remove the distortion horizontal and vertical and gain parameter to do this. Proceed to Step 16

Step 15 For distortion of center, the center for the distortion needs to be investigated so that the exact position can be gained from the calibration process.

Software or mathematical routines can be used to remove the distortion horizontal and vertical and gain parameter in this regards.

Step 16 All parameter need to be saved and are dedicated only to the camera used in this process.

Step 17 repeat all steps in the process of recalibration the camera to ensure quality and to detect potential change or damage to the camera after use in a suitable time frame.

Taking Pictures or Series of Individual Blades in Designated Positions

The process of taking pictures is the next step to gain raw pictures for further processing of gaining data of the blades angles in respect to the airfoil, a reference or each other.

It has to be made sure that the blades with no geometrical issues such as cone angle deviations are to be taken to position the camera for the purpose of taking all necessary photographs.

Step 18 It needs to be verified that the screen on the camera does provide a grid overlay with sufficient small square sections.

Step 19 If the camera does not provide a sufficient overlay grid one has to establish one by drawing fine horizontal and vertical lines on the screen. It is of advantage to mark those with grid coordinates.

Step 20 Essential for positioning the blade it needs to be investigated whether the rotor lock does have the same partition as the number of blades. For instance on a three blade rotor the rotor lock needs to have 120 degree positions, or whole number dividers of it like 60 degree, 30 degree and so on. Those positions should be as close as possible to a straight down position. If possible a picture away from the turbine should document the angle of the blade relative to the tower for further measures to compensate trapezoidal perspective distortion if absolute angles are the goal of the measurement.

This only applies for rotor lock systems at the main "low speed" shaft. Rotor lock systems at the high speed side do normally not provide and equal partition position due to the gear box ratio.

If not possible proceed with Step 35.

Step 21 If the turbine does provide a sufficient rotor lock system the first blade needs to be brought in position as straight down as possible with the rotor lock applied.

Step 22 Approximate a suitable camera position to take pictures in the designated area of the blade needed to perform the measurements.

Step 23 Take on picture of the first blade in position and in the desired pitch angle.

Step 24 Repeat taking one picture of every other blade in the same position with the same desired pitch angle with applied rotor lock.

Step 25 Compare the position of the blade or for the measurement relevant area on the cameras screen relative to the grid on the cameras screen.

Step 26 Do all blades match in vertical position (up and down) in the picture? If not this would indicate a cone angle issue. Do all blades match in horizontal (left, right) position in the picture?

If not this would indicate a 120 degree partition deviation issue. If all positions match proceed with Step 29.

Step 27 If the positions of all blades do not match, the blades closest in position to each other need to be identified. Those blades need to be marked down as regular. Non regular blades do have a slight difference in perspective while the other blades should be in optimal position.

Step 28 Bring one of the regular marked blades in position straight down, with the rotor lock applied and in the desired pitch angle. Optimize the cameras position for best position to take all further pictures. Proceed with Step 31.

Step 29 Bring any blade in a straight down position with the rotor lock applied and in the desired pitch angle. Optimize the cameras position for best position to take all further pictures.

Step 31 Take the designated amount of pictures of the first blade in position in the designated pitch angle position.

Step 32 Bring every other blade in the same position and desired pitch angle and with the rotor lock applied for every blade, as it was done with the first blade and take the designated number of pictures.

Step 33 While leaving the tripod in position, check all pictures taken for clarity and focus. This should be done on a bigger screen then the cameras screen for instance on a laptop screen.

Step 34 If all pictures have sufficient clarity and focus in the areas measurements are about to be performed proceed with Step 72. If the pictures lack enough clarity or focus proceed at Step 26.

Step 35 When a rotor lock as described in Step 20 is not available it needs to be investigated if the blade tip does provide a distinguishable feature identical for each blade. Such feature can be a drainage hole at the blades tip or a from the blades surface slightly upraised lighting protector puck. If such features are not available proceed with Step 49.

Step 36 Position the first blade as straight down as possible and apply the rotor break and or rotor lock.

Step 37 Approximate a suitable camera position to take pictures in the designated area of the blade needed to perform the measurements.

Step 38 Take on picture of the first blade in position and in the desired pitch angle. Mark the distinguishable feature with a vertical line on the cameras screen or make a note off the position in the camera screen grid.

Step 39 Repeat taking one picture of every other blade in the same position with the same desired pitch angle with the rotor brake and or rotor lock applied. Move every other blade with the distinguishable feature to the vertical mark or position from the first blade.

Step 40 Compare the horizontal position of the blade or for the measurement relevant area on the cameras screen relative to the grid on the cameras screen.

Step 41 Do all blades match in vertical position (up and down) in the picture? If not this would indicate a cone angle issue. If positions match proceed with Step 44.

Step 42 If the positions of all blades do not match, the blades closest in position to each other need to be identified. Those blades need to be marked down as regular.

Step 43 Bring one of the regular marked blades in position straight down, the distinguishable feature at the vertical mark, with the rotor brake and or rotor lock applied, in the desired pitch angle. Optimize the cameras position for best position to take all further pictures. Proceed with Step 45.

Step 44 Bring any other blade in position straight down, the distinguishable feature at the vertical mark, with the rotor brake and or rotor lock applied, in the desired pitch angle. Optimize the cameras position for best position to take all further pictures.

Step 45 Take the designated amount of pictures of the first blade in position in the designated pitch angle position.

Step 46 Bring every other blade in position straight down, the distinguishable feature at the vertical mark, with the rotor brake and or rotor lock applied, in the desired pitch angle, as it was done with the first blade and take the designated number of pictures.

Step 47 While leaving the tripod in position, check all pictures taken for clarity and focus. This should be done on a bigger screen then the cameras screen, for instance on a laptop screen.

Step 48 If all pictures have sufficient clarity and focus in the areas measurements are about to be performed proceed with Step 72. If the pictures lack enough clarity or focus proceed at Step 41.

Step 49 Position the first blade as straight down as possible and apply the rotor break and or rotor lock. Pitch the blade into a 90 degree position.

Step 50 Approximate a suitable camera position to take pictures in the designated area of the blade needed to perform the measurements.

Step 51 Take on picture of the first blade in position and in the desired pitch angle. Mark the horizontal position of the blade with a vertical line or note the position on the cameras grid.

Step 52 Take on picture from each other blade with pitch angle at 90 degree at the same vertical line or mark.

Step 53 Compare the vertical position of the blade or for the measurement relevant area on the cameras screen relative to the grid on the cameras screen.

Step 54 Do all blades match in vertical position in the picture? If not proceed with Step 60.

Step 55 Bring any other blade in position straight down, pitched at 90 degree, with the rotor brake and or rotor lock applied. Line the blade up with the mark made before or with the grid position. Optimize the cameras position for best position to take all further pictures.

Step 56 Take the designated amount of pictures of the first blade pitched to 0 degree or the designated pitch position.

Step 57 Bring every other blade pitched to 90 degree in the same vertical position at the mark or grid position. Then pitch blade to 0 degree or the designated pitch position and take the designated amount of pictures Step 58 While leaving the tripod in position, check all pictures taken for clarity and focus. This should be done on a bigger screen then the cameras screen, for instance on a laptop screen.

Step 59 If all pictures have sufficient clarity and focus in the areas measurements are about to be performed proceed with Step 72. If the pictures lack enough clarity or focus proceed at Step 55.

Step 60 Determine the two blades closest together in position and mark them down as regular Step 61 Mark down any noticeable vertical deviation of the other blades on the cameras screen relative to the grid on the cameras screen.

Step 62 optimize the camera position setup, starting with one regular marked blade in a straight down position.

Step 63 Take the designated amount of pictures of the first blade pitched to 0 degree or the designated pitch position.

Step 64 Bring every other regular blade pitched to 90 degree in the same vertical position at the mark or grid position. Then pitch blade to 0 degree or the designated pitch position and take the designated amount of pictures.

Step 65 Determine if the vertical deviation of the non-regular blade is above the regular position. If the position is above the regular position proceed with Step 67

Step 66 Bring each non regular blade pitched at 90 degree stopped to the left in the screen with the amount marked under Step 61. Proceed with Step 68

Step 67 Bring each non regular blade pitched at 90 degree stopped to the right in the screen with the amount marked under Step 61.

Step 68 Take the designated amount of pictures of the first blade pitched to 0 degree or the designated pitch position.

Step 69 make sure all non-regular blades are photographed. If non-regular blades are left proceed with Step 65

Step 70 While leaving the tripod in position, check all pictures taken for clarity and focus. This should be done on a bigger screen then the cameras screen, for instance on a laptop screen.

Step 71] If all pictures have sufficient clarity and focus in the areas measurements are about to be performed proceed with Step 72. If the pictures lack enough clarity or focus proceed at Step 62.

Step 72 Store all pictures marked as raw pictures in a suitable manner.

Applying Lens Distortion Correction Methods with Data Gained Under "I." on Pictures or Isolated Video Stream Pictures Any measurements in the pictures gained and not corrected for lens distortion would be deemed to be effected by errors and therefore dangerous to be used for any decision making.

All pictures to be used for measurements have to be corrected for lens distortion with the parameters gained during the camera calibration process.

With the process described below the pictures are lifted from the status of raw data into usable data for any further measurement. However effects caused by trapezoidal distortion are not removed by it.

All pictures taken or isolated under Step 18 and following and to be used in measurements to follow, have to be pre-processed before.

Step 73 All pictures have to be reviewed on a suitable screen. This is to identify the pictures with the highest quality. Not all pictures taken might be usefully and would if used only raise the general uncertainty when a measurement error is statistically gained.

Step 74 It has to be determined if obvious and significant signs of heat gradients in or close to designated measurement areas are present in any pictures. The index of refraction of air decreases as the air temperature increases as this happens on heated surfaces like the blades, nacelle or tower. Usually deformation of the shape of the blades root which should be a perfect circle is one indication.

If this can be ruled out proceed with Step 76.

Step 75 If significant signs of heat gradients in or close to designated measurement areas are visible then those pictures need to be discarded. It may ultimately mean that the whole session of taking pictures needs to be re-done.

Step 76 The more pictures are taken the more different the pictures are in overall quality and can show a lack thereof in all or single designated measurement areas. This needs to verified and only the best pictures are to be evaluated. Proceed with the highest quality pictures Step 78.

Step 77 All pictures with a lack of quality in one or more designated measurement areas will be discarded.

Step 78 All pictures to be taken for further processing and measurements need to be backed up in there original state.

Step 79 The software which was used for Step 1 and following the camera calibration needs to be opened, alternative an equivalent software can be used. All pictures are loaded individual or together.

Step 80 The parameter gained during the camera calibration process to remove the lens distortion are now applied to each picture to compensate and remove such effects.

Step 81 All pictures are now to be saved distinguishable from there original state or file.

The pictures are now ready to get any measurements performed to determine deviations between the blades angles to each other but not to a reference.

Applying Methods of Correcting Trapezoidal Perspective Distortion.

If the measurement goal is the absolute angle of attack to determine the pitch angle in reference to the rotor plane the correction of lens distortion is not sufficient enough since the geometric relation between the camera position reference planes and measurement planes are still under the influence of trapezoidal perspective distortion in an unknown extend.

There are two cases of trapezoidal distortion caused by differences in perspective to the object lines plane in the processes for determination of blade angle measurements in regards to the deviation of those between the individual blades and or absolute angles.

Figure 8:
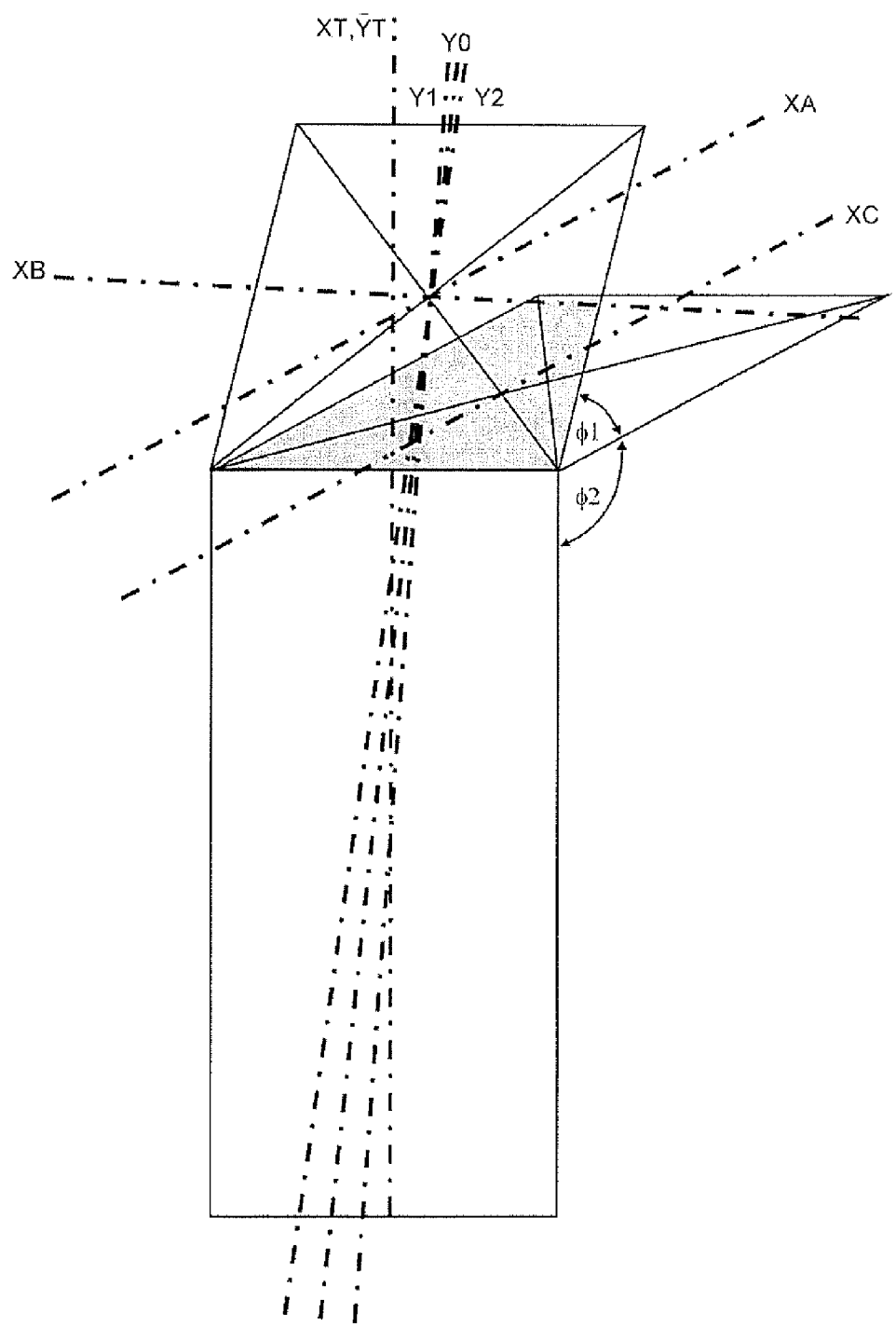
FIG. 8 is a schematic illustration of the angles between object planes used in calculating trapezoidal distortion.

The main effect to be corrected is caused by the apparent disposition and therefore angle between the optical axis (Y0, Y1 or Y2, FIG. 7 and FIG. 8) during taking the photos which should be identical with a designated part of the blades axis compared to the vertical axis of the tower (XT, XY FIG. 7 and FIG. 8). and the axis of the nacelles body (XA, XC FIG. 7 and FIG. 8).

Figure 10:
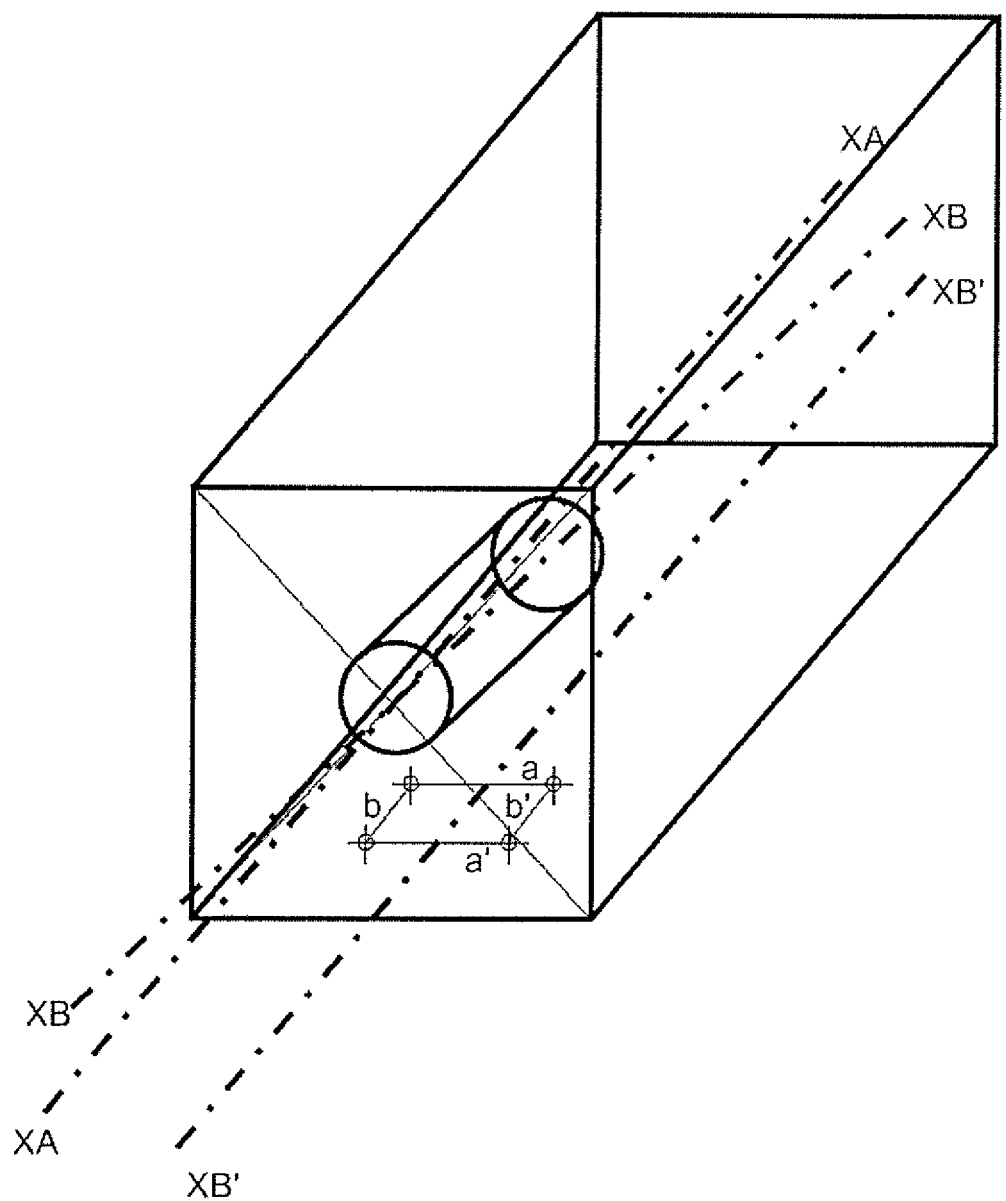
FIG. 10 is a schematic illustration of an image of the angles of FIGS. 7 and 8 used in calculating trapezoidal distortion.

To correct the trapezoidal distortion, reference points, holes or marks have to be established (e.g. FIG. 10).

The key feature of those is that there position to each other is known. They should in the best case present the corners of a rectangle as shown in FIG. 9. It would consist of the sides a, a', b and b'.

It needs to big enough to detect trapezoidal distortion sufficiently, which does mean it should be possible to detect widening effects in the size of 0.5 degree or smaller depending on the desired accuracy, while the usual effect is in the range of up to 5 degree.

To achieve a useful position for it, the drive train axis XB which is 90 degree to the rotor plane though the center of rotation of the rotor plane needs to be projected to the nacelles floor or any other suitable surface to gain the axis XB'. XA or XC (FIG. 7) is not necessary projections of the drive trains axis.

The rectangle to be established should have the lines b and b' perfectly parallel to XB'.

After the lens correction is performed under step 73 for each picture to be measured, the trapezoidal distortion of the reference rectangle can to be determined.

With suitable software the rectangle can be adjusted to match the original correlations between a and a' as well as b and b'.

The parameter gained with this can be applied to correct the angle for the reference to fulfill the requirements for a suitable measurement of attack.

The reference is now true in a known angle to the rotor plane which would describe zero degree pitch.

Another effect of trapezoidal distortion is caused by a measurement line created on a sloping away contour line. Sloping away does mean away from the camera. This needs to be addressed and compensated with detailed knowledge of the blades design.

In the blades tip area the slope can be typically up to 45 degree or more which would cause a widening of the angle by the factor of 2.

To eliminate those distortions, not knowing blade design features, measurements need to be taken for angles close to or at the tip and at the maximum width of the blade. Even so the accuracy at the tip might not be as good as at the maximum width because of the shorter measurement line, the deviations between both measurements should be close or identical. If this is not the case it needs to be investigated which measurement is affected most by trapezoidal distortion. Usually the measurement which does show the bigger deviation with is under the influence of widened angles caused by trapezoidal distortion.

The invention claimed is:

1. A method of aerodynamic balancing a plurality of wind turbines in a wind farm, each wind turbine comprising a respective tower and a nacelle mounted to the top of the respective tower, a respective rotor rotatably connected to the nacelle for rotating about a rotor axis and having a plurality of equally spaced blades where each blade has an adjustable angle of attack, where rotation of each rotor around an axis generates a value of torsional vibration of the rotor on the respective wind turbine the method comprising:
for each of at least some of the wind turbines, measuring the value of the torsional vibration of the respective rotor of the wind turbine;
after the value of the torsional vibration of each of at least some of the wind turbines is measured, selecting a plurality of the turbines having a value of torsional vibration beyond a predetermined set value for analysis of the angle of attack of the blades of the selected turbines, thereby avoiding analyzing all of the blades of all of the rotors;
for each turbine selected, measuring said adjustable angle of attack of each of the blades of the turbine and in the event that said adjustable angle of attack of one of the blades is different from that of the other blades by an angle difference greater than a predetermined angle, carrying out an adjustment of said adjustable angle of attack of said one of the blades to reduce the blade angle difference;
and re-measuring the torsional vibration of the system to ensure that it is reduced by the adjustment,
wherein said value of torsional vibration is measured using two vibration sensors at positions mirrored exactly in distance to the left and right of the rotor axis and detecting vibration in a direction longitudinal of said axis so as to eliminate by subtraction all vibration in said longitudinal direction and doubling torsional vibrations;
wherein the angle of attack of the blades is measured by the step of:

providing a camera for obtaining images of the blades;

prior to obtaining images of the blades, obtaining at least one image taken by the camera of a calibration grid;

carrying out a comparison of said at least one image of the calibration grid relative to the calibration grid itself to obtain data relating to distortion caused by the camera;

positioning the camera below the rotor;

rotating the rotor so that each blade in turn is in a reference position in which a tip of the blade is directed toward the camera;

capturing an image of the tip of each blade in turn in the reference position;

in the captured image correcting angles in the captured image at different locations in the captured image in dependence upon said data relating to distortion by the camera to obtain corrected angles;

and carrying out an analysis of the corrected angles in the captured image to determine a blade angle of each blade.

2. The method according to claim 1 wherein, during said analysis using said corrected angles, different points of the captured image of the tip are identified in the captured image and the angles between the different points are corrected using said data relating to distortion by the camera in dependence upon locations of the different points in the captured image.

3. The method according to claim 1 wherein, during said analysis using said corrected angles, contour lines or reference points of the captured image of the tip are used which are selected so that said contour lines or reference points are identical on every blade.

4. The method according to claim 1 wherein, during the analysis using said data relating to distortion by the camera, correction is made for trapezoidal distortion in the captured image.

5. The method according to claim 4 wherein during the analysis using said data relating to distortion by the camera, correction is made for trapezoidal distortion in the captured image caused by an angle between an optical axis of the camera compared to a vertical axis of the tower.

6. The method according to claim 4 wherein during the analysis using said data relating to distortion by the camera, correction is made for trapezoidal distortion in the captured image caused by a measurement line created on a sloping away contour line, that is sloping away from the camera.

7. The method according to claim 1 wherein for the capturing of the image of the tip of each blade in turn, one of the blades is selected to be first imaged.

8. The method according to claim 7 wherein the blade is selected to be first imaged by determining any one which has cone angle deviation and by selecting as the first one which has less cone angle deviation.

9. The method according to claim 8 wherein the blade is selected to be first imaged by applying a rotor lock to locate each blade in turn as close as possible to the vertically downward position and by taking an image of each blade in turn from a remote position to determine those that are closest in position to each other at the vertically downward position and selecting as the first to be imaged one of those which are closest.

* * * * *